(12) United States Patent
Liu et al.

(10) Patent No.: US 7,894,517 B2
(45) Date of Patent: Feb. 22, 2011

(54) SELF-CALIBRATED ADAPTIVE EQUALIZATION SYSTEM AND METHODS OF PERFORMING THE SAME

(75) Inventors: Hao Liu, Richardson, TX (US); Yanli Fan, Allen, TX (US); Mark W. Morgan, Allen, TX (US); Mohammed R. Islam, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 698 days.

(21) Appl. No.: 11/986,900

(22) Filed: Nov. 27, 2007

(65) Prior Publication Data

US 2009/0135895 A1 May 28, 2009

(51) Int. Cl.
*H03H 7/30* (2006.01)
*H03H 7/40* (2006.01)
*H03K 5/159* (2006.01)

(52) U.S. Cl. ............... 375/232; 375/230; 375/350; 708/322; 708/323

(58) Field of Classification Search ............ 375/232, 375/233, 234, 230, 350; 708/322, 323
See application file for complete search history.

(56) References Cited

U.S. PATENT DOCUMENTS

2006/0098727 A1* 5/2006 Kuijk ............... 375/232

* cited by examiner

*Primary Examiner*—Phuong Phu
(74) *Attorney, Agent, or Firm*—John J. Patti; Wade J. Brady, III; Frederick J. Telecky, Jr.

(57) ABSTRACT

A self-calibrating, adaptive equalization system for generating an ideal digital signal is disclosed. The adaptive equalization system includes an equalizer and a high-gain buffer. The equalizer includes a first equalizer loop that feeds-back a control voltage to the equalizer and the high-gain buffer that includes a second equalizer loop that feeds-back a high-pass-to-low-pass filter ratio signal. Each of the first and second equalizer loops has a high-pass and a low-pass filter, rectifying circuits for each of the filters, and an integrating circuit that compares signal energy output from the rectifiers. The adaptive equalization system generates an ideal digital signal.

10 Claims, 3 Drawing Sheets

SELF-CALIBRATED ADAPTIVE EQUALIZATION SYSTEM AND METHODS OF PERFORMING THE SAME

BACKGROUND

The non-ideal effects associated with channel loss in connection with broadband data communication systems such as high-definition television (HDTV) impact signal quality increasingly as the bit rate increases. In particular, non-ideal effects such as skin effect loss and dielectric loss in the channel, e.g., cable, printed circuit board trace, and the like, attenuate data more significantly at higher frequencies. Indeed, data attenuation can be represented by the following transfer function, L(f):

$$L(f) = e^{-l(k_s\sqrt{jf} + k_d|f|)} \qquad (1)$$

where f is the frequency, l is the channel length, and $k_s$ and $k_d$ are the skin effect loss constant and dielectric loss constant of the channel, respectively.

One way avoiding bit errors and inter-symbol interference (ISI) that results from the interference between adjacent pulses and for receiving a high quality data signal is "equalization". Equalization counteracts channel loss to compensate for transmission loss and to recover the distorted signal using an inverse or reciprocal frequency transfer function as the channel loss, i.e., 1/L(f). Because the exact characteristics of the channel are unknown, adaptive equalization is preferable to fixed equalization. Adaptive equalization refers to the ability of the system to adapt to find the proper compensation level for a specific channel.

An example of a conventional adaptive equalization system can be seen in FIG. 1. The equalization system 10 includes an equalizer 15 and an equalizer loop 18 that provides a control voltage 11 to the equalizer 15 to achieve a desired equalization level. More particularly, the equalizer loop 18 includes a low-pass filter (LPF) 12, a high-pass filter (HPF) 14, rectifiers 17 and 19, and an integrator 13. In operation, output from the equalizer 15 is provided to both the LPF 12 and HPF 14, which extract signal energy within the respective frequency bands. Filter outputs are rectified by the pair of rectifiers 17 and 19, and, then, integrator 13 attempts to adapt the equalizer 15 by adjusting the control voltage 11 (which is applied to a control voltage terminal of equalizer 15).

The ratio between the signal energies of the LPF 12 and the HPF 14 is preset and fixed, e.g., the ratio of high-pass-to-low-pass filter signal energy can be preset and fixed at 1:1. However, in practice, the adapted operating point is not fixed so the high-pass-to-low-pass filter signal energy, typically, is not 1:1. The high-pass-to-low-pass filter ratio is variable due to, for example, the channeling medium, the transmitted data, process, supply voltage, temperature, and the like. Accordingly, the control signal 11 of the adaptive equalizer 15 may be imperfect, resulting in a correspondingly incorrect or non-ideal equalizer gain setting.

In either instance, over-equalizing or under-equalizing an attenuated input signal causes jitter. Consequently, it would be desirable to provide a self-calibrating adaptive equalization system to improve jitter performance.

SUMMARY

A self-calibrating, adaptive equalization system for generating an ideal digital signal is disclosed. The adaptive equalization system includes an equalizer and a high-gain buffer or "slicer", that is adapted to provide a $sinc^2(x)$ spectrum. The equalizer includes a first equalizer (feedback) loop that feeds-back a control signal to the equalizer. The high-gain buffer includes a second equalizer (feedback) loop that provides a high-pass-to-low-pass filter ratio signal, which is fed-back to the first equalizer loop to adjust the control signal.

Each of the first and second equalizer loops has a high-pass and a low-pass filter, rectifying circuits for each of the filters, and an integrating circuit that compares signal energy output from the rectifiers. The adaptive equalization system generates an ideal digital signal.

BRIEF DESCRIPTION OF THE DRAWINGS

The invention will be more fully understood by reference to the following Detailed Description of the invention in conjunction with the Drawings, of which.

DETAILED DESCRIPTION

Figure 1:
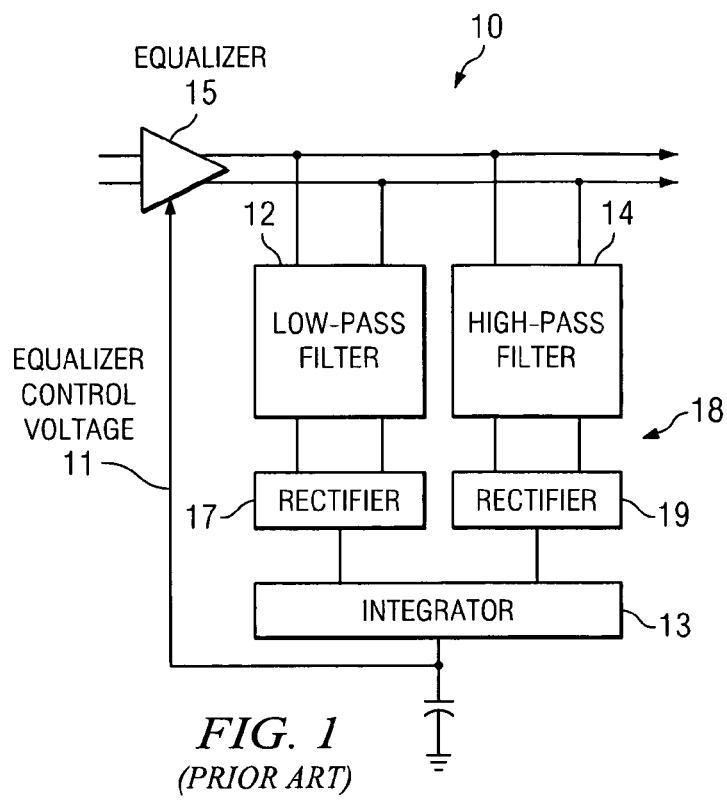
FIG. 1 shows an block diagram of an example of a conventional adaptive equalizer.
Figure 2:
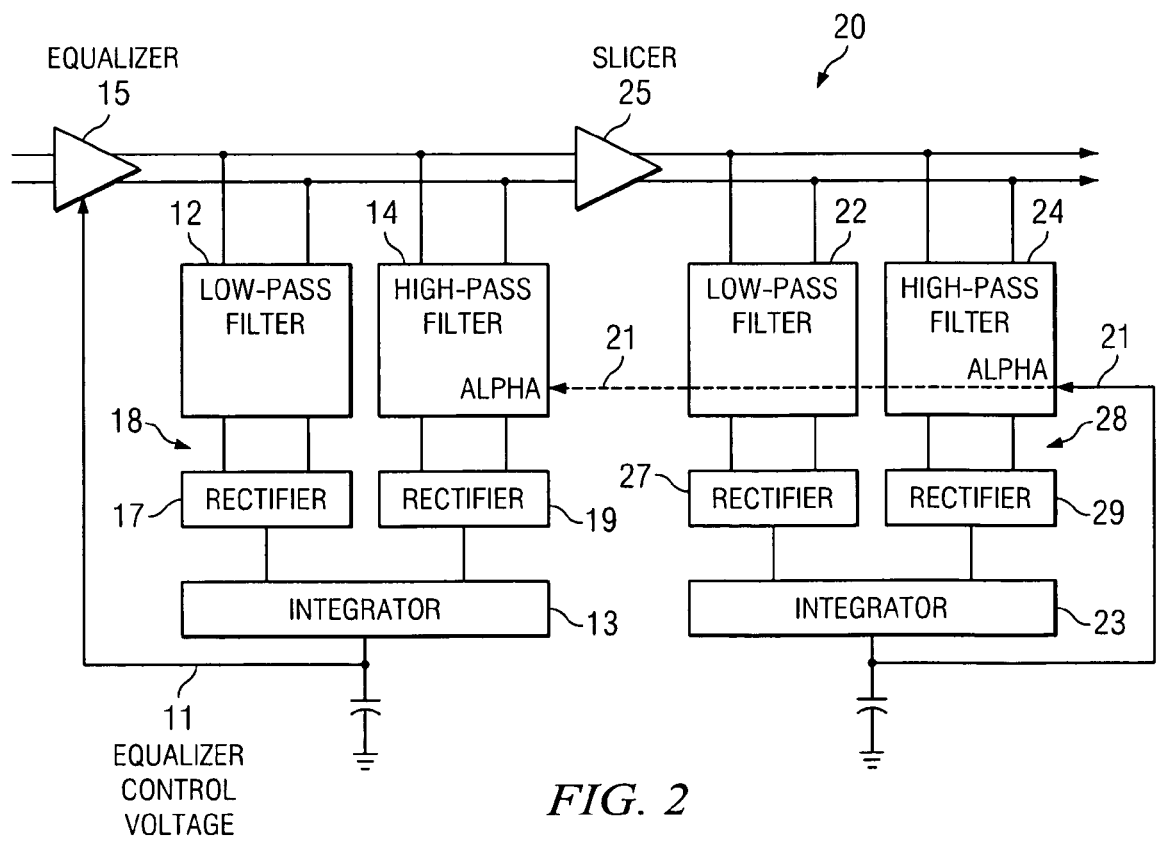
FIG. 2 shows an block diagram of an example of an adaptive equalizer in accordance with the present invention.

Turning to FIG. 2, an example of an adaptive equalization system 20 in accordance with the present invention can be seen. System 20 includes an adaptive equalizer 15, equalizer or feedback loops 18 and 28, and a high-gain buffer (or "slicer") 25. The feedback loop 18 includes LPF 12, HPF, 14, rectifiers 18 and 19, and integrator 13, and feedback loop includes LPF 22, HPF, 24, rectifiers 27 and 29, and integrator 23. As previously described, the adaptive equalizer 15 receives and processes an attenuated input signal that can be affected by the transmitted data, the process, the temperature, the supply voltage, and the like. Output from the adaptive equalizer 15 is then provided to equalizer loop 18. The LPF 12 and HPF 14 of equalizer loop 18 extract signal energy within the respective frequency bands of the equalizer output. The outputs from the filters 12 and 14 are then rectified by their respective rectifiers 17 and 19, and the rectified signals are used by the integrator 13 to attempts to adapt the equalizer 15 by adjusting the control voltage 11. The integrator 13 determines the difference between the signal energies of the LPF 12 and the HPF 14. To account for changes in the high-pass-to-low-pass filter ratio (HPF/LPF) due to several variables (for example, the transmitted data, the process, supply voltage, temperature, and the like), an "alpha" correction signal can be used to account for the changes and, as a result, to adjust the control signal 11 to the adaptive equalizer 15.

Figure 3:
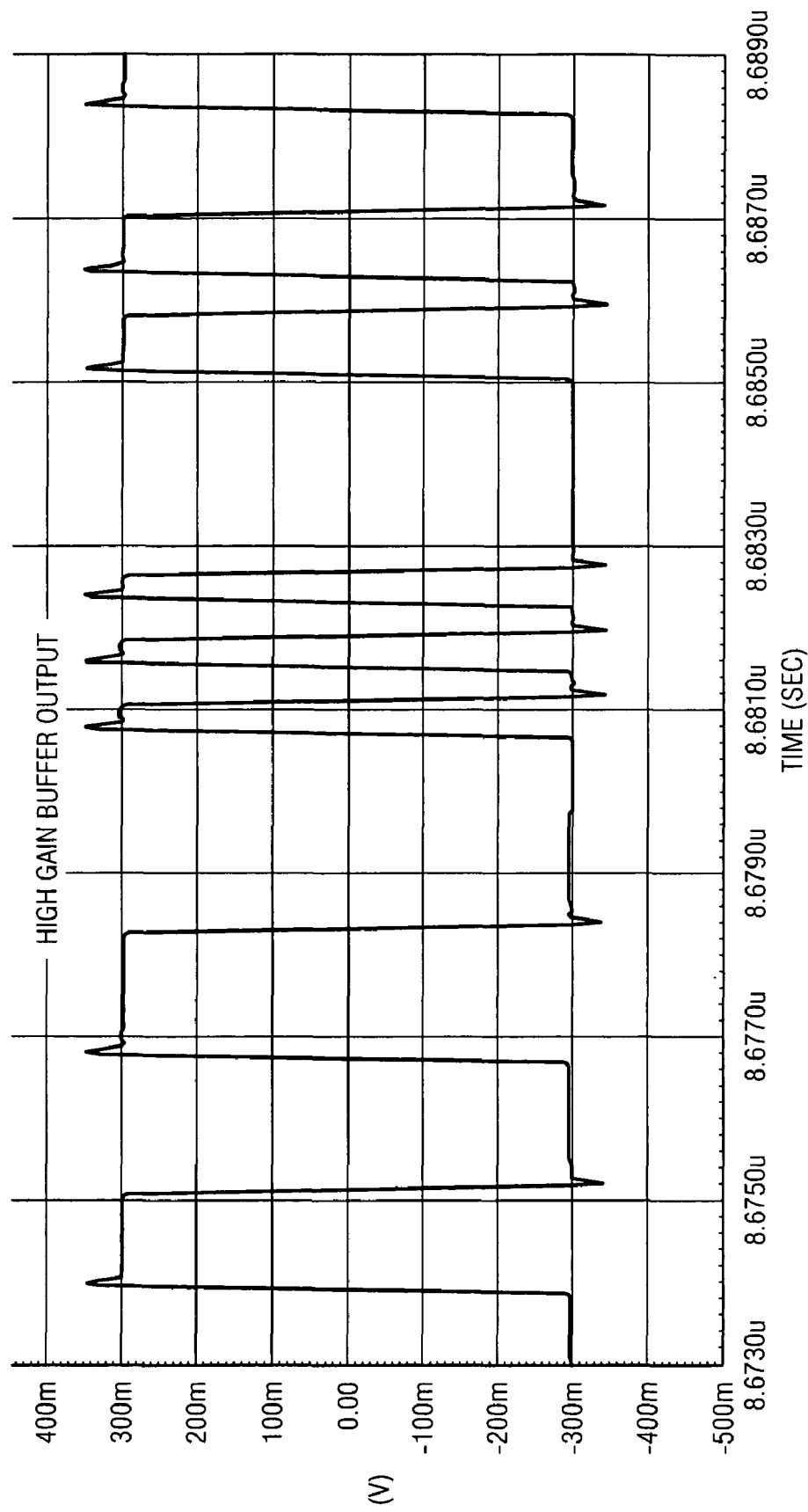
FIG. 3 shows high-gain buffer output voltage waveforms in the time domain.

FIG. 3 shows illustrative high-gain buffer voltage output waveforms in the time domain. In the time domain, the high-gain buffer 25 creates a waveform having a very sharp edge rate, which is to say that the rise and fall times are shorter and more abrupt, and also having a faster transition. In the frequency domain, however, the high-gain buffer 25 outputs an ideal digital signal having $sinc^2(x)$ spectrum characteristics, which is to say that the edges of the waveform have been squared-up. Squaring-up the edges of the waveform translate into faster transition times and shorter rise and fall times. As a result, the frequency spectrum, or frequency content, is representative of the desired output after the adaptive equalization stage.

Figure 4:
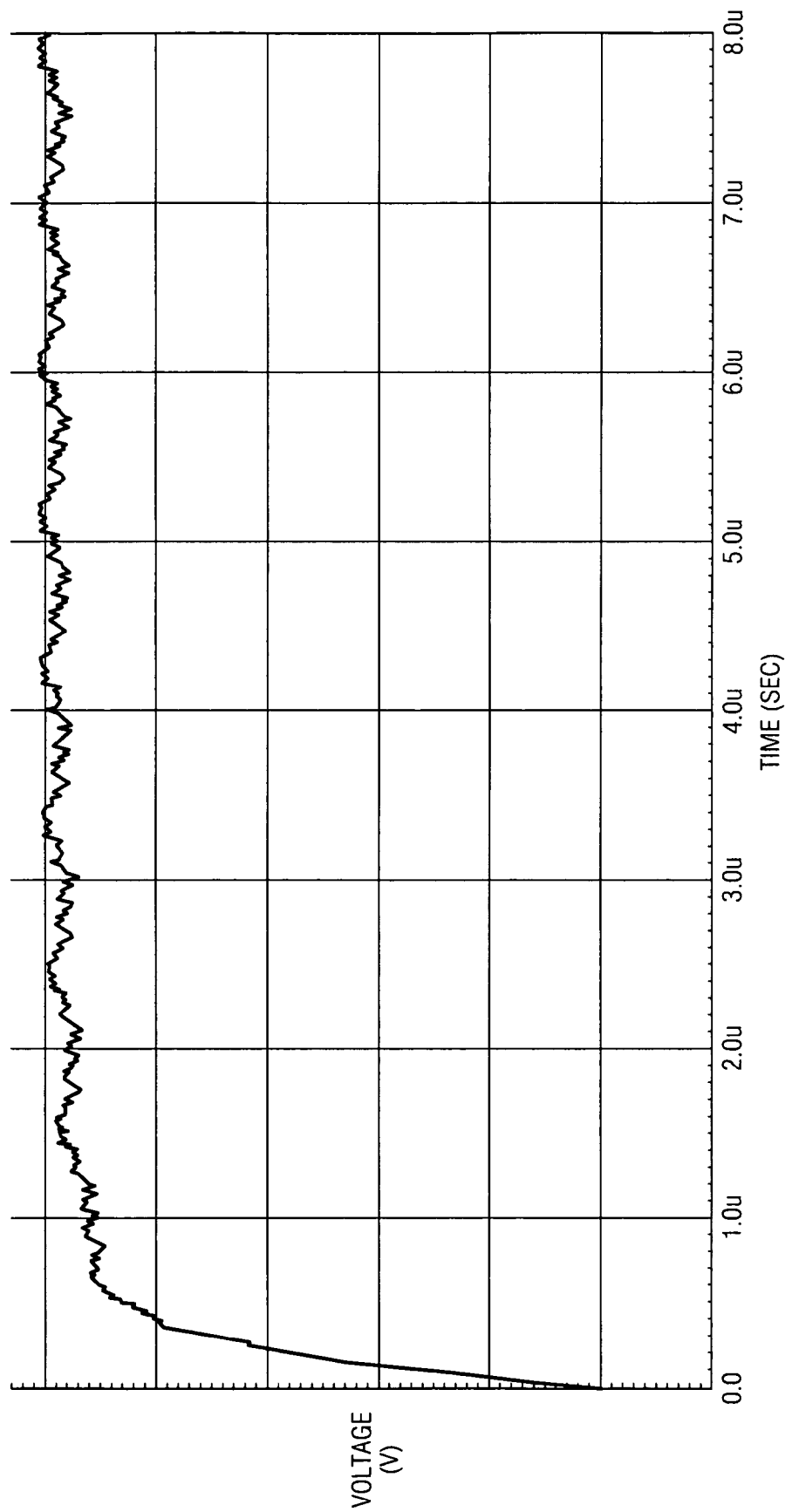
FIG. 4 shows corrective signal output.

To take advantage of this, the high-gain buffer 25 is used to generate a corrective, "alpha" signal as a reference signal for use by the adaptive equalizer 15 in generating an ideal digital signal. For example, the high-gain buffer 25 output is provided to each of LPF 22 and HPF 24 in equalizer loop 28. The LPF 22 and HPF 24 of the second equalizer loop 28 also extract signal energy within the respective frequency bands of the high-gain buffer 25 output signal. The signal energies from the filters 22 and 24 are then rectified by their respective rectifiers 27 and 29, and the integrator 23 generates the correction signal 21 (an example of which can be seen in FIG. 4). The corrective, "alpha" signal 21 is fed-back to each of the HPFs 14 and 24. Alternatively, the corrective, "alpha" signal 21 can be fed-back to each of the LPFs 12 and 22 or to the HPFs 14 and 24 and the LPFs 12 and 22. The corrective, "alpha" signal 21 establishes the target HPF/LPF ratio gain, ensuring that the signal energy differences between the LPF 12 and HPF 14 are driven to zero (and the HPF/LPF ratio is driven to unity). After taking into account the HPF/LPF ratio, the first equalizer loop 18 generates the ideal control signal 11. Additionally, rectifiers 17 and 19 and integrator 13 can operate as an adjustment circuit for loop 18, while rectifiers 27 and 29 and integrator 23 can operate as an adjustment circuit for loop 28.

Output from the high-gain buffer 25 continues to pass through the LPF 22 and through the HPF 24 where the signal energy is adjusted as a function of the corrective, "alpha" signal 21. This corrective process continues until the signal energy levels between the LPF 22 and HPF 24 are equal, which is to say that the difference between the signal energies is zero. The resulting corrective, "alpha" signal 21 associated with the equalizer loop 28 is representative of the HPF/LPF ratio required to make the output of the entire system 20 "ideal".

Using a SPICE simulation tool, a fixed "alpha" equalization system 10 and a self-calibrating equalization system 20 were simulated. Table I summarizes the jitter results for a High-Definition Multimedia Interface Channel 5M cable (2.5 Gbps) for each system. NNN refers to a nominal process, a nominal supply voltage, and a nominal, i.e., room, temperature. HLH refers to a strong process corner, a low supply voltage, and a high temperature. LHL refers to a weak process corner, a high supply voltage, and a low temperature.

As shown in Table I, jitter of the self-calibrating adaptive equalization system 20 is improved (reduced) by about one-third over the fixed energy-ratio system for the HLH and LHL simulations.

TABLE I

| | Type of "Alpha" | | | | | |
| --- | --- | --- | --- | --- | --- | --- |
| | FIXED ALPHA | | | SELF-CALIBRATING ALPHA | | |
| Corner (PVT) | NNN | HLH | LHL | NNN | HLH | LHL |
| Alpha (mV) | 650 | 650 | 650 | 650 | 750 | 640 |
| Jitter (ps) | 60 | 80 | 70 | 60 | 56 | 57 |

In summary, the high-gain buffer 25 and equalizer loop 28 are adapted to determine an optimum HPF/LPF ratio that is self-calibrating and, moreover, independent of process, supply voltage, and temperature conditions.

It will be apparent to those skilled in the art that modifications to and variations of the disclosed method and system are possible without departing from the inventive concepts disclosed herein, and therefore the invention should not be viewed as limited except to the full scope and spirit of the appended claims.

What is claimed is:

1. An apparatus comprising:
   an equalizer;
   a first equalizer loop that is coupled to an output of the equalizer, that includes a first low-pass filter (LPF) and a first high-pass filter (HPF), and that generates a control signal for the equalizer;
   a high-gain buffer that is coupled to the output of the equalizer; and
   a second equalizer loop that is coupled to an output of the high-gain buffer, that includes a second LPF and a second HPF, and that generates a corrective signal for at least one of the first and second HPFs or the first and second LPFs.

2. The apparatus of claim 1, wherein the corrective signal corresponds to a HPF/LPF ratio gain.

3. An apparatus comprising:
   an equalizer having an input terminal, an output terminal, and a control voltage terminal;
   a first equalizer loop that includes:
      a first LPF that is coupled to the output terminal of the equalizer;
      a first HPF that is coupled to the output terminal of the equalizer; and
      a first adjustment circuit that is coupled to the first LPF, the second LPF, and the control voltage terminal of the equalizer and that generates a control signal for the equalizer;
   a high-gain buffer having a input terminal and an output terminal, wherein the input terminal of the high-gain buffer is coupled to the output terminal of the equalizer; and
   a second equalizer loop that includes:
      a second LPF that is coupled to the output terminal of the high-gain buffer;
      a second HPF that is coupled to the output terminal of the high gain buffer; and
      a second adjustment circuit that is coupled to the second LPF and the second HPF, wherein the second adjustment circuit generates a corrective signal so as to adjust HPF/LPF ratio gain for the first and second equalization loops.

4. The apparatus of claim 1, wherein the first LPF and the first HPF are coupled to the output of the equalizer, and wherein the first equalizer loop further comprises an adjustment circuit that is coupled to the first LPF and the first HPF, and wherein the adjustment circuit provides the control signal to the equalizer.

5. The apparatus of claim 4, wherein the adjustment circuit further comprises a first adjustment circuit, and wherein the second LPF and the second HPF are coupled to the output of the high-gain buffer, and wherein the second equalization loop further comprises a second adjustment circuit that is coupled to the second LPF and the second HPF so as to generate the corrective signal.

6. The apparatus of claim 3, wherein the first adjustment circuit further comprises:
   a first rectifier that is coupled to the first LPF;
   a second rectifier that is coupled to the first HPF; and
   an integrator that is coupled to the first rectifier, the second rectifier, and the control voltage terminal of the equalizer.

7. The apparatus of claim 6, wherein the integrator further comprises a first integrator, and wherein the second adjustment circuit further comprises:
   a third rectifier that is coupled to the second LPF;
   a fourth rectifier that is coupled to the second HPF; and a second integrator that is coupled to the third and fourth rectifiers.

8. The apparatus of claim 7, wherein the second integrator is coupled to the first and second HPFs.

9. The apparatus of claim 7, wherein the second integrator is coupled to the first and second LPFs.

10. The apparatus of claim 7, wherein the second integrator is coupled to the first LPF, the second LPF, the first HPF, and the second HPF.

* * * * *